June 10, 1947.    L. T. RADER    2,422,040
MAGNETIC DRIVE
Filed Jan. 27, 1945
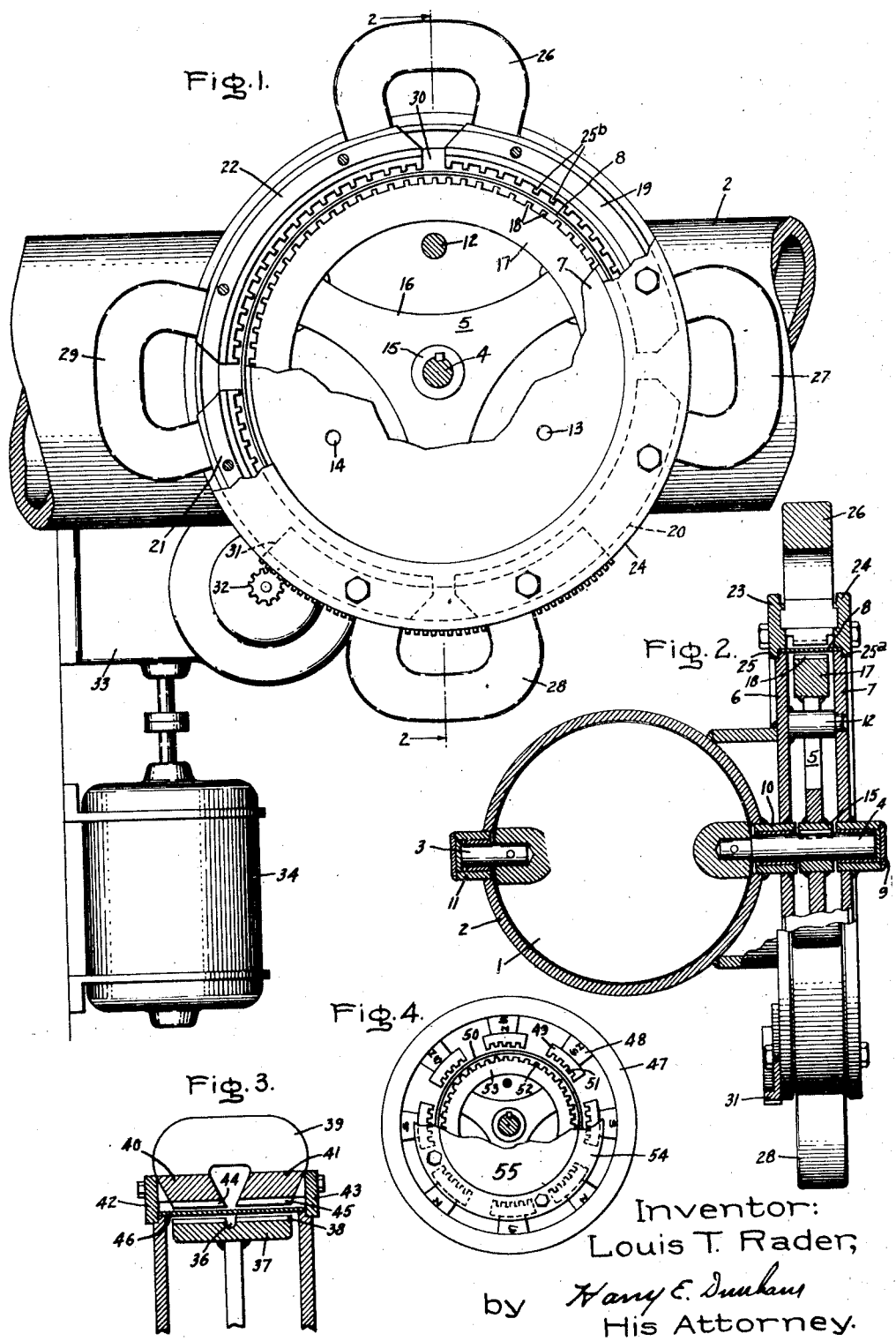
Inventor:
Louis T. Rader,
by Harry E. Dunham
His Attorney.

Patented June 10, 1947

2,422,040

UNITED STATES PATENT OFFICE 2,422,040

MAGNETIC DRIVE

Louis T. Rader, Schenectady, N. Y., assignor to General Electric Company, a corporation of New York Application January 27, 1945, Serial No. 574,904

7 Claims. (Cl. 172—284)

My invention relates to magnetic drives, more particularly to a magnetic drive for a member in a sealed chamber, such as a valve in a sealed pipe, and has for its object simple, reliable and efficient magnetic drive means utilizing permanent magnets.

In carrying out my invention in one form, I utilize an annular stator member which is mounted for limited angular movement and which is made up into a plurality of arcuate segments having their ends in spaced relation. Across each pair of spaced ends of the arcuate members I provide permanent magnet means for producing a magnetic field whereby the ends or poles of the magnet are constituted by the two arcuate members. Inside of the so-called stator member, I provide a circular rotor member which is mounted for limited angular movement, and which is separated from the surrounding stator member by a thin annular layer or sheet of non-magnetic material. This layer of nonmagnetic material, furthermore, closes a sealed chamber in which is mounted the rotor member. The adjacent spaced surfaces of the stator member and inner rotor member, separated by the nonmagnetic sheet, are provided with teeth which form a plurality of poles, whereby the magnetic field set up by the permanent magnets apply a force to hold the teeth in a predetermined registering relation dependent on the torque exerted on the inside rotor teeth by the mechanism to which they are attached. Thus, when the stator member is turned by suitable means, as by an electric motor, the inner rotor member is turned with the stator member by reason of the magnetic attraction between the teeth, but with an angle of displacement between them.

For a more complete understanding of my invention, reference should be had to the accompanying drawing, Fig. 1 of which is a side elevation view partly in section of a magnetic drive embodying my invention; Fig. 2 is a view in section taken along the line 2—2 of Fig. 1 looking in the direction of the arrows; while Figs. 3 and 4 are fragmentary sectional views showing modified forms of my invention.

Referring to the drawing, I have shown my invention in one form as applied to the driving or turning of a butterfly valve 1 in a sealed pipe 2. The valve is mounted on pivot shafts 3 and 4 secured thereto, the shaft 4 being elongated and having secured to it a driving wheel or rotor member 5.

This rotor member is enclosed by disc-shaped plates 6 and 7 on opposite sides, which plates are sealed together at their peripheries by a thin annular sheet or diaphragm 8 made of nonmagnetic metal, such as Monel metal. At its center, the disc member 7 is provided with a hub cap 9 which encloses and seals the end of the shaft 4 and also provides a bearing for the shaft 4, while the disc 6 is provided with a central tubular member 10 surrounding the shaft 4 and having its outer or left-hand end secured and sealed to the pipe 2. Likewise, the tubular member 10 is provided with an internal bearing for the shaft 4. An enclosing cap 11 is provided for the outer end of the pivot shaft 3. Thus, this construction seals the rotor or driving member 5 in a chamber defined by the discs 6 and 7 and the peripheral sheet 8, which chamber communicates through the bearing in the member 10 with the chamber constituted by the pipe 2.

For strengthening purposes, a plurality of metal studs 12, 13 and 14 are provided extending between the end plates 6 and 7 and having their ends secured to the plates. Preferably, as shown, the ends of the studs are reduced in size to provide shoulders for the plates 6 and 7 whereby the plates are especially strengthened against external or internal pressures such, for example, as would be applied by the air in the event of a partial or complete vacuum or pressurized gas in the enclosed chamber.

The rotor member 5 comprises a hub 15 secured to the shaft 4 and a three-legged spider support 16 connecting the hub 15 with an outer annular rim member 17 made of magnetic material. On its outer periphery, this rim is provided with a plurality of equally spaced teeth 18 extending parallel with the shaft 4. The outer ends of these teeth 18 are in closely spaced relation with the inner surface of the sheet 8.

Surrounding the rotor member is a stator or driving member consisting of four arcuate shaped pole piece members 19, 20, 21 and 22 made of magnetic material which are clamped between two annular members 23 and 24, the inner edges of which are mounted at 25 and 25a on the peripheries of the two disc members 6 and 7 so that the stator driving member assembly, including the magnetic members 19—22 and the side clamping members 23 and 24, can be turned on the end disc members 6 and 7 thereby to turn with them the rotor 5. The annular members 23 and 24 are made of a nonmagnetic material, such as brass.

On the inner walls of the members 19—22 inclusive are spaced teeth 25b, the ends of which form pole faces and are in closely spaced relation with the outer surface of the sheet 8. The angular spacing between the teeth 25b is the same as the angular spacing between the teeth 18 on the rotor member, and the actual circumferential spacing and width of the teeth in the two sets is the same except for the slight difference caused by the fact that the teeth 18 have a smaller radius.

For the purpose of creating a magnetic flux thereby to hold the rotor member in a predetermined angular relation with the stator member, permanent magnets 26, 27, 28 and 29 are provided. These magnets are horseshoe-shaped and extend across the gaps or spaces between the adjacent ends of each pair of the magnetic members 19—22. Thus the adjacent ends of the members 19 and 22 are separated by an air gap 30, and the magnet 26 extends across this air gap with its ends secured to the outer peripheral surfaces of the members 19 and 22 at points near the ends of the members. The magnets 27, 28 and 29 are similarly arranged with respect to the other magnetic members. The magnets are mounted on the stator member with poles of like polarity adjacent each other. Thus, for example, the south poles of the magnets 26 and 29 are secured to the magnetic member 22, while the north poles of the magnets 26 and 27 are secured to the member 19, etc.

Thus the magnets produce each a magnetic field which passes from one end of the magnet through the adjacent teeth 25b in the stator, through the nonmagnetic sheet 8 and air gaps to the teeth 18, and through the rim 17 across the air gaps and sheet 8 back to the other pole of the magnet. Thus, magnetic attractive forces are produced between the teeth of the stator and rotor members, which forces tend to hold the rotor member in an angular relation with the stator member which is dependent on torque exerted on the rotor so that when the stator member is turned in either direction, the rotor member is turned with it, whereby the valve 1 is turned. It will be observed that the rotor has sufficient freedom with respect to the bracing studs or pins 12, 13 and 14 to provide for substantially ninety degrees rotation to provide for movement of the valve 1 between fully closed and fully opened positions.

For driving the rotor member, I provide a gear segment 31 which is secured to the end annular ring 23. Cooperating with this segment 31 is a driving gear 32 which is connected through a speed reducing gear drive 33 to an electric driving motor 34 so that the gear 32 is driven at only a fraction of the speed of the motor.

In a modified form of my invention shown in Fig. 3, I provide an annular groove 36 in the periphery of the rim 37 whereby the projections or teeth 38 are divided each into two portions of equal length, the groove 36 extending into the rim below the bases of the teeth, thereby to form an air gap between the two rows of teeth. In this form, the permanent magnets 39 (only one of which is shown) are arranged parallel with the axis of rotation of the rim 37 and bridge the space between two annular members 40 and 41 made of magnetic material, these members being mounted on the annular supporting members 42 and 43 which are similar to the members 23 and 24 of Figs. 1 and 2. On the inner circumferences of the members 40 and 41 are teeth 44 and 45 having the same spacing as the teeth 38 and having their ends in closely spaced relation with the outer face of the sheet 46, the teeth 38 being in closely spaced relation with the inner surface of the diaphragm.

With this arrangement, it will be observed that each magnet produces a magnetic field which passes from one pole face constituted by the ends of the teeth through the nonmagnetic sheet 46 to the teeth 38 on one side of the rim, then across the rim to the teeth on the other side through the nonmagnetic sheet back to the magnet. Thus the stator constituted by the supports 42 and 43 and the members carried by it is magnetically locked with the rim or rotor and rotation of the stator carries the rotor with it.

Preferably, I make the permanent magnets for my device from a material having a relatively high coercive force in relation to its size. A suitable material for this purpose is an alloy comprising by weight 6–15 per cent aluminum, 12–30 per cent nickel, and about 5 per cent copper if desired, the remainder being iron, such as described and claimed in U. S. Patents Nos. 1,947,274 and 1,968,569, issued on February 13, 1934, and July 31, 1934, respectively, to William E. Ruder.

In the modified form of my invention shown in Fig. 4, I provide a solid ring 47 made of magnetic material on the inside of which are mounted a plurality of bar magnets 48 extending radially with respect to the member 47. As shown, eight of these bar magnets equally spaced around the ring are provided. These magnets are magnetized with their opposite poles on their radial extremities and further arranged with their poles alternating in engagement with the member 47.

Each magnet 48 is provided with a pole piece 49 made of magnetic material whose inner face adjacent the layer of nonmagnetic material 50 is cylindrical and provided with equally spaced projections 51 having the same spacing as the projections 52 on the rotor member 53 which has the same construction as the rotor member 17 of Fig. 1. The cross section of the pole pieces 49 may be the same as the cross section of the pole pieces 19—22 inclusive of Fig. 1. The pole pieces 49 are clamped between two annular rings 54 similar to the rings 23 and 24 of Figs. 1 and 2, only one of the rings 54 being shown in Fig. 4. The rings 54, carrying the annular member 47, the magnets and the pole pieces, are rotatably supported upon a pair of stationary plates 55, similar to the plates 6 and 7 of Figs. 1 and 2.

If desired, for the purpose of reducing the cost of construction, the pole pieces 49 may be made from plates of magnetic material in which parallel grooves forming the teeth 51 are cut, after which the surfaces of the teeth are machined to give them an arcuate form on their inner ends.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A magnetic drive comprising a rotor member provided with a rim of magnetic material and with equally spaced axially extending teeth on its periphery, an enclosure for said rotor member including a layer of nonmagnetic material surrounding said rotor member having its inner surface adjacent the ends of said teeth, a stator member including a plurality of arcuate magnetic members, means rotatably supporting said magnetic members in spaced relation with each other adjacent said layer of nonmagnetic material, a plurality of permanent magnet means secured to said magnetic members so as to bridge said magnetic members and secure said magnetic members to each other, each of said permanent magnet means having its poles secured respectively to said magnetic members, a plurality of teeth on the inner surfaces of said magnetic members adjacent the outer surface of said layer of nonmagnetic material having substantially the same spaced relation as said teeth on said rotor member whereby magnetic driving forces are set up between said stator and rotor members, and means for turning said stator member thereby to turn said rotor member with said stator member.

2. A magnetic drive comprising a rotor member provided with a rim of magnetic material and with equally spaced axially extending teeth on its periphery, an enclosure for said rotor member including a layer of nonmagnetic material surrounding said rotor member having its inner surface adjacent the ends of said teeth, a stator member including a plurality of arcuate magnetic members, means rotatably supporting said arcuate members in peripheral spaced relation with each other around said rotor member, a plurality of permanent magnets mounted to bridge said magnetic members, a plurality of teeth on the inner surfaces of said arcuate members adjacent the outer surface of said layer of nonmagnetic material having substantially the same spaced relation as said teeth on said rotor member whereby magnetic driving forces are set up between said stator and rotor members, and means for turning said stator member thereby to turn said rotor member with said stator member.

3. A magnetic drive comprising a rotor member provided with a rim of magnetic material and with equally spaced axially extending teeth on its periphery, a stationary end disc on each side of said rotor member, a layer of nonmagnetic material joining the peripheries of said discs having its inner surface adjacent the ends of said teeth, a stator member including a pair of annular members rotatably mounted on said end discs, at least one of said annular members being made of non-metallic material, a plurality of arcuate magnetic members secured between said annular members in spaced relation with each other, a plurality of permanent magnets mounted to bridge said magnetic members and secure said magnetic members together, a plurality of teeth on the inner surfaces of said arcuate members adjacent the outer surface of said layer of nonmagnetic material having substantially the same spaced relation as said teeth on said rotor member whereby magnetic driving forces are set up between said stator and rotor members, and means for turning said stator member thereby to turn said rotor member with said stator member.

4. A magnetic drive comprising a rotor member provided with a rim of magnetic material and with equally spaced axially extending teeth on its periphery, a stationary end disc on each side of said rotor member, a layer of nonmagnetic material joining the peripheries of said discs having its inner surface adjacent the ends of said teeth, a stator member including a pair of annular members rotatably mounted on said end discs, a plurality of arcuate magnetic members secured between said annular members in peripheral spaced relation with each other, a permanent magnet mounted to bridge each space between adjacent ends of said arcuate members, like poles of adjacent magnets being associated with opposite ends of each of said arcuate members, a plurality of teeth on the inner walls of said arcuate members having substantially the same spaced relation as said teeth on said rotor member whereby magnetic driving forces are set up between said stator and rotor members, and means for turning said stator member thereby to turn said rotor member with said stator member.

5. A magnetic drive comprising a first driving rotor member provided with a rim of magnetic material and with equally spaced axially extending teeth on its periphery, a support for said first driving member including a layer of nonmagnetic material surrounding said first driving member having its inner surface adjacent the ends of said teeth, a second driving member including a pair of annular magnetic members surrounding said first driving member, means rotatably supporting said annular magnetic members in spaced relation with each other adjacent the outer surface of said layer of nonmagnetic material, a plurality of permanent magnets secured to said annular members with the ends of each of said magnets connected respectively to said annular members and with like poles of said magnets connected to each of said annular members, a plurality of teeth on the inner surfaces of said annular members adjacent the outer surface of said layer of nonmagnetic material having substantially the same spaced relation as said teeth on said rotor member whereby magnetic driving forces are set up between said driving members, and means for turning one of said driving members thereby to turn the other of said driving members.

6. A magnetic drive comprising a rotor member provided with a rim of magnetic material and with equally spaced axially extending teeth on its periphery, an enclosure for said rotor member including a layer of nonmagnetic material surrounding said rotor member having its inner surface adjacent the ends of said teeth, a stator member including a pair of annular magnetic members surrounding said rotor member, means rotatably supporting said magnetic members in spaced relation with each other adjacent the outer surface of said layer of nonmagnetic material, a plurality of permanent magnets secured to said annular members with the ends of each of said magnets connected respectively to said annular members and with like poles of said magnets connected to each of said annular members, a plurality of teeth on the inner surfaces of said annular members adjacent the outer surface of said layer of nonmagnetic material having substantially the same spaced relation as said teeth on said rotor member whereby magnetic driving forces are set up between said stator and rotor members, and means for turning said stator member thereby to turn said rotor member with said stator member.

7. A magnetic drive comprising a rotor member provided with a rim of magnetic material and with equally spaced axially extending teeth on its periphery, a stationary disc member on each side of said rotor member, a layer of nonmagnetic material joining the peripheries of said discs with its inner surface adjacent the ends of said teeth, a pair of annular members made of nonmagnetic material rotatably mounted on said discs, a pair of annular magnetic members supported on said annular nonmagnetic members in spaced relation with each other, a plurality of permanent magnets secured between said annular magnetic members in peripheral spaced relation with each other, like poles of said magnets being connected to each of said annular magnetic members, a plurality of teeth on the inner surfaces of said annular magnetic members adjacent the outer surface of said layer of nonmagnetic material having substantially the same spaced relation as said teeth on said rotor member whereby magnetic driving forces are set up between said stator and rotor members, and means for turning said stator member thereby to turn said rotor member with said stator member.

LOUIS T. RADER.

REFERENCES CITED

The following references are of record in the file of this patent:

UNITED STATES PATENTS

| Number | Name | Date |
|---|---|---|
| 1,911,960 | Lipman | May 30, 1933 |
| 2,131,035 | Beechlyn | Sept. 27, 1938 |